(12) United States Patent
Chen et al.

(10) Patent No.: US 7,996,036 B1
(45) Date of Patent: *Aug. 9, 2011

(54) METHOD AND SYSTEM FOR PROVIDING MOBILITY TO ENHANCED CALL SERVICE FEATURES AT REMOTE LOCATIONS

(75) Inventors: Yihsiu Chen, Middletown, NJ (US); Mark Jeffrey Foladare, East Brunswick, NJ (US); Kathleen C. Fowler, Wall, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US); Aleksandr Zelezniak, Matawan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/641,161

(22) Filed: Dec. 19, 2006

Related U.S. Application Data

(63) Continuation of application No. 10/833,479, filed on Apr. 27, 2004, now Pat. No. 7,174,189, which is a continuation of application No. 09/805,292, filed on Mar. 13, 2001, now Pat. No. 6,823,197.

(51) Int. Cl.
 *H04W 4/00* (2009.01)
(52) U.S. Cl. ............... 455/554.1; 455/554.2; 455/555; 379/219; 379/220.01; 379/225; 379/433.1
(58) Field of Classification Search .............. 379/69, 379/74, 84, 93.04, 219, 220.01, 225, 433.1; 455/418, 425, 426.1, 428, 426.2, 554.1, 554.2, 455/555

See application file for complete search history.

(56) References Cited

U.S. PATENT DOCUMENTS

| | | | | |
|---|---|---|---|---|
| 5,742,596 | A * | 4/1998 | Baratz et al. | 370/356 |
| 5,841,854 | A * | 11/1998 | Schumacher et al. | 379/265.11 |
| 6,014,377 | A * | 1/2000 | Gillespie | 370/351 |
| 6,198,932 | B1 * | 3/2001 | Nakanishi | 455/450 |
| 6,301,339 | B1 * | 10/2001 | Staples et al. | 379/93.01 |
| 6,314,303 | B1 * | 11/2001 | Phipps | 455/555 |
| 6,324,410 | B1 * | 11/2001 | Giacopelli et al. | 455/554.1 |
| 6,356,554 | B1 * | 3/2002 | Pickett et al. | 370/402 |
| 6,434,169 | B1 * | 8/2002 | Verreault | 370/522 |
| 6,453,035 | B1 * | 9/2002 | Psarras et al. | 379/221.08 |
| 6,496,694 | B1 * | 12/2002 | Menon et al. | 455/426.2 |
| 6,542,475 | B1 * | 4/2003 | Bala et al. | 370/271 |
| 6,553,102 | B1 * | 4/2003 | Fogg et al. | 379/88.25 |
| 6,560,222 | B1 * | 5/2003 | Pounds et al. | 370/353 |
| 6,567,514 | B2 * | 5/2003 | Fleischer et al. | 379/221.03 |

(Continued)

*Primary Examiner* — Pierre-Louis Desir

(57) ABSTRACT

A system and method for providing PBX-like functionality at a remote office location includes the capability of maintaining a network session with a mobile number associated with the remote worker once the worker terminates the remote office session. The system utilizes a remote office platform interposed between a data communications network and a conventional PBX switch (located either at a subscriber-based office location or within the communication network and shared by a number of different subscribers). A remotely located individual (such as a telecommuter) "logs in" to the remote office platform and, once the individual is authenticated, a graphical user interface (GUI) emulating a PBX station set is enabled at the remote employee's personal computer, the GUI including a field for entry of the user's mobile number. When the user ends the session at the remote location, the platform invokes a mobility process to maintain a communication session with the remote worker via the communication device associated with the mobile number.

9 Claims, 3 Drawing Sheets

U.S. PATENT DOCUMENTS

| | | | |
|---|---|---|---|
| 6,633,636 B1* | 10/2003 | McConnell et al. | 379/220.01 |
| 6,668,176 B1* | 12/2003 | Koski et al. | 455/552.1 |
| 6,711,401 B1* | 3/2004 | Chow et al. | 455/414.1 |
| 6,816,583 B2* | 11/2004 | Roeder | 379/212.01 |
| 6,823,197 B1* | 11/2004 | Chen et al. | 455/554.1 |
| 6,882,862 B1* | 4/2005 | Chia et al. | 455/555 |
| 6,915,437 B2* | 7/2005 | Swander et al. | 726/1 |
| 6,937,704 B1* | 8/2005 | Meijer et al. | 379/88.18 |
| 6,970,719 B1* | 11/2005 | McConnell et al. | 455/554.1 |
| 6,985,723 B2* | 1/2006 | Kil | 455/426.1 |
| 7,136,475 B1* | 11/2006 | Rogers et al. | 379/213.01 |
| 7,171,199 B1* | 1/2007 | Rahman | 455/433 |
| 7,200,218 B1* | 4/2007 | Lindley et al. | 379/221.11 |
| 7,260,078 B1* | 8/2007 | Ledsham et al. | 370/338 |
| 7,319,693 B2* | 1/2008 | Chen | 370/352 |
| 7,386,452 B1* | 6/2008 | Bates et al. | 704/270 |
| 7,466,978 B1* | 12/2008 | Chapman et al. | 455/422.1 |
| 2001/0041594 A1* | 11/2001 | Arazi et al. | 455/561 |
| 2001/0046860 A1* | 11/2001 | Lee | 455/426 |
| 2002/0001301 A1* | 1/2002 | Sarkissian et al. | 370/352 |
| 2002/0009991 A1* | 1/2002 | Lu et al. | 455/422 |
| 2002/0021465 A1* | 2/2002 | Moore et al. | 359/125 |
| 2002/0034168 A1* | 3/2002 | Swartz et al. | 370/329 |
| 2002/0049768 A1* | 4/2002 | Peek et al. | 707/104.1 |
| 2002/0065758 A1* | 5/2002 | Henley | 705/37 |
| 2002/0069278 A1* | 6/2002 | Forslow | 709/225 |
| 2002/0076031 A1* | 6/2002 | Falcon et al. | 379/265.11 |
| 2002/0098855 A1* | 7/2002 | Hartmaier et al. | 455/466 |
| 2002/0107014 A1* | 8/2002 | Kosuri | 455/426 |
| 2002/0181398 A1* | 12/2002 | Szlam | 370/230 |
| 2003/0235284 A1* | 12/2003 | Fleischer et al. | 379/221.01 |
| 2006/0013240 A1* | 1/2006 | Ma et al. | 370/401 |
| 2006/0019688 A1* | 1/2006 | Kil | 455/517 |
| 2007/0259688 A1* | 11/2007 | Forte | 455/555 |
| 2008/0025295 A1* | 1/2008 | Elliott et al. | 370/356 |

\* cited by examiner

METHOD AND SYSTEM FOR PROVIDING MOBILITY TO ENHANCED CALL SERVICE FEATURES AT REMOTE LOCATIONS

CROSS-REFERENCE TO RELATED APPLICATION

This application is a continuation of U.S. application Ser. No. 10/833,479, filed Apr. 27, 2004 now U.S. Pat. No. 7,174,189, and allowed on Sep. 25, 2006, which is a continuation of U.S. application Ser. No. 09/805,292, filed Mar. 13, 2001, now U.S. Pat. No. 6,823,197, issued on Nov. 23, 2004.

TECHNICAL FIELD

The present invention relates to a method and system for incorporating user mobility with the implementation of enhanced call service features at a remote location such that the PBX-like features can be accessed at any desired location.

BACKGROUND OF THE INVENTION

During the past decade, the number of professionals that "telecommute" (i.e., work at home or other "virtual office" locations) has increased significantly. Although the proliferation of various types of computing and telephony equipment has enabled these workers to be effective, there remain a number of office-related advantages that cannot, without great expense, be duplicated at home. Additionally, in situations where an individual spends a significant amount of time traveling, it becomes even more difficult to provide certain advantages, such as PBX-based telecommunication features as are found in most conventional office environments. A private branch exchange (PBX) switch is commonly known in the art as a system useful in providing certain calling features such as abbreviated dialing, call transfer, hold, mute, and others, within an office complex served by the PBX switch. One exemplary PBX switch is the Definity™ switch sold by Avaya, Inc.

A PBX switch may be located "on site" as customer premise equipment—CPE—(one example of CPE being the Definity switch sold by Avaya) or located within the communications network and used by one or more different customers. An exemplary network-based PBX is disclosed in U.S. Pat. No. 5,742,596 issued to Y. Baratz et al. on Apr. 21, 1998. With a network-based PBX, the various office locations may be referred to as "remote" in the sense that the physical office locations need to establish a link with the network-based PBX to obtain the desired functionality. The office stations themselves, however, are equipped with the traditional PBX station set equipment. The actual location of the PBX switch, therefore, is of no concern to the office worker.

In some situations, "telecommuters" have incurred the expense of adding an additional phone line, or ISDN, to handle the increase in telephony traffic associated with working at home. While this solution is acceptable in some situations, it quickly becomes an expensive alternative for the employer. Further, the "traveling" employee has no "home office" within which to install such equipment, remaining disadvantaged with respect to the personnel at a traditional work location. Indeed, the technology deployed at the home office may "lag" the latest PBX-based innovations found in the office.

As described in our pending application Ser. No. 09/370,766, an individual at a location "remote" from the office may have "PBX-like" capabilities, with all communications being controlled by a remote office platform, linked to the remote worker. In particular, the remote office platform is linked to the office PBX system. Features such as abbreviated dialing for in-house calls, call forwarding, call transfer, hold, three-way calling, secretarial pick-up, and more, are provided at a remote location where an individual can connect to the remote platform and have a user interface display available. The graphical user interface (GUI), in a preferred embodiment, is a "soft phone", displaying a PBX station-like set-up including a handset, call feature buttons, a message center, and the like.

The system as described in this pending application uses a remote office platform that communicates with both the office (or network) PBX and a data network coupled to the remote office location. The remote office platform includes the software necessary to "push" the GUI to the remote device and also comprises a database including necessary information regarding each employee permitted to access the "virtual PBX" system. Once activated by a remote worker, the remote office platform communicates with the office PBX so as to communicate all PBX-based requests from the remote location back to the office PBX. In the other direction, all incoming calls to the remote worker's PBX extension are forwarded by the PBX to the remote office platform and, ultimately, to the remote location. The term "office PBX" as used throughout this discussion is considered to include a customer-premise PBX, a network-based PBX (perhaps being shared by a number of different subscribers), or any other suitable PBX architecture.

In operation of this arrangement, a remote worker establishes authenticated communication with the remote office platform. Voice connectivity between the office PBX and remote worker can be provided over whatever telephony connection exists at the remote location (POTS over PSTN, cable, fixed wireless, among others). Data connectivity, used for transferring all call requests between the remote worker and the remote office platform, as well as enabling the PBX-like interface at the remote end, may be provided by any suitable data network including, but not limited to, the Internet.

Although the system as disclosed in our pending application is extremely proficient in allowing a "remote worker" access to many of the available office features, once the worker "logs out" of the system, all of the interconnect information is lost, and the worker must go through the entire process of logging in to be re-connected. While this is not very problematic for instances where the remote worker remains at the same off-site location, for those individuals that spend any quantity of time "on the road" or at multiple locations, it may become burdensome to constantly require the worker to re-activate the remote office system.

Thus, a need remains in the remote office environment for addressing the mobility of most remote workers, allowing such individuals to remain in communication with a remote office platform.

SUMMARY OF THE INVENTION

The need remaining in the prior art is addressed by the present invention, which relates to a method and system for incorporating user mobility with the implementation of enhanced call service features at a remote location such that the PBX-like features can be accessed at any desired location.

In accordance with the present invention, mobility is incorporated into a remote worker's environment by allowing the individual to enter a mobile number prior to ending an interconnect session with a remote office platform. Once the individual terminates a particular remote session, the stored mobile number associated with that individual will be used by the remote office platform to maintain an active session with the remote worker. In particular, a mobility process is created and maintained at a central server in the network so as to run in background mode, transparent to the user. When an individual terminates a remote session, the process will be triggered to initiate the mobile session. Thus, until the worker terminates the mobile session, the mobile number will be used by the remote platform to maintain contact with the remote worker. In one embodiment, the process may be implemented as a Java script applet, although other implementations are possible.

In accordance with the present invention, the mobile number is used only when the remote worker is not logged into the system; the mobile number remaining inactive, but ready to be re-activated once the individual ends the session. The worker may, at any time, change the mobile number stored within his data record at the remote platform database.

Other and further aspects of the remote worker mobility features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
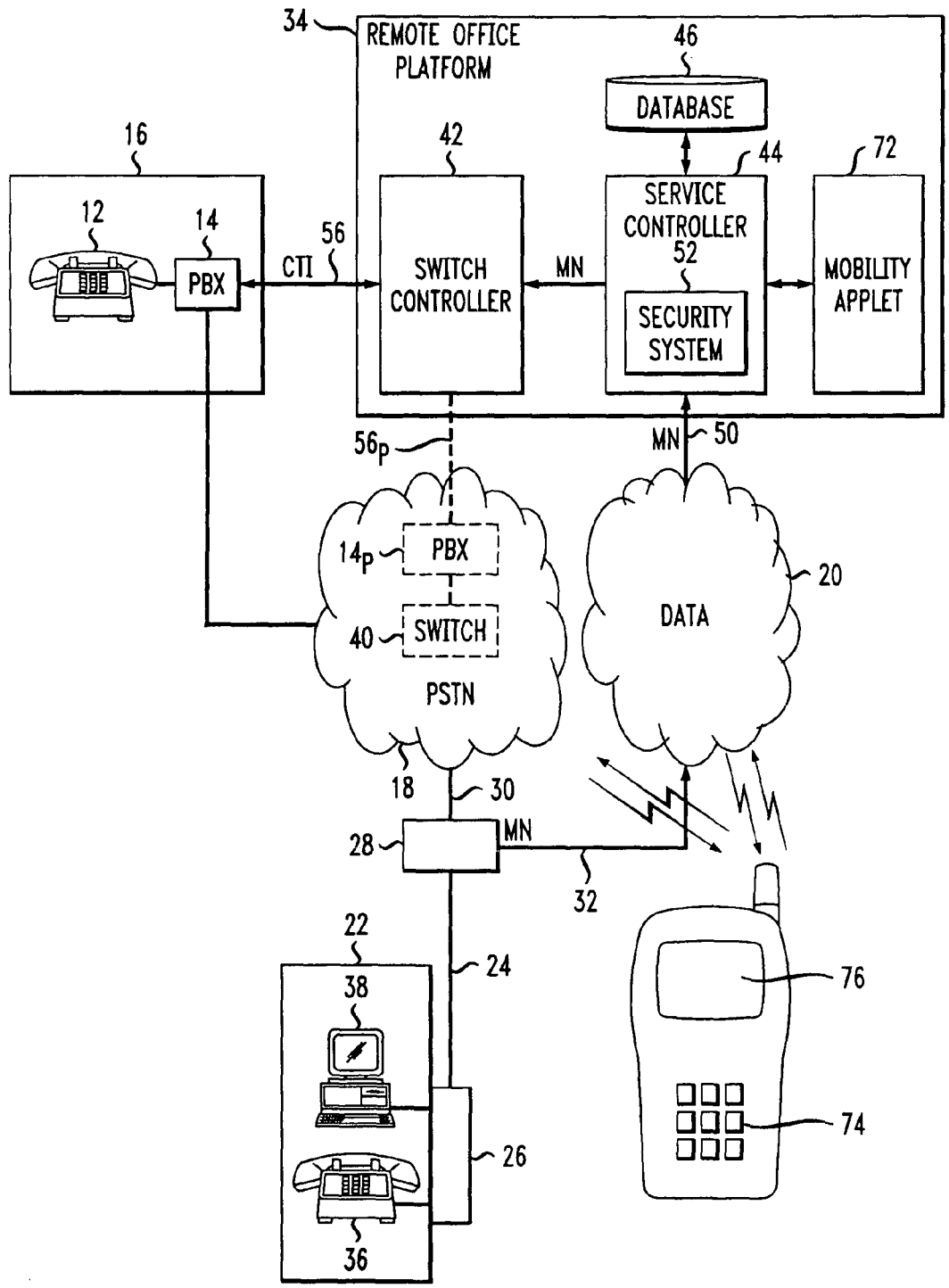
FIG. 1 contains a block diagram of an exemplary "remote worker" system incorporating the mobility aspect of the present invention.

An exemplary architecture 10 for implementing the mobility feature of a "remote office" platform is illustrated in FIG. 1. Throughout the remainder of this discussion, the term "remote office" will be used interchangeably with the term "virtual PBX", since in most instances it is PBX-like features that are implemented, via a soft phone graphical user interface (GUI) described below in association with FIG. 2, in a remote office location. In particular, FIG. 1 illustrates an exemplary arrangement including a conventional office station set 12 and PBX switch 14 located within an office structure 16. Each station set 12 includes conventional PBX features such as call forward, mute, conference, hold, etc. PBX 14 is shown as connected to a voice network 18 (e.g., PSTN) and data network 20 (e.g., Internet). As mentioned above, the physical location of PBX switch 14 is not critical to the implementation of the present invention. That is, the PBX may comprise customer premise equipment—CPE—as shown in FIG. 1, or may, alternatively, reside in the network (e.g., a PBX switch $14_P$ as shown in phantom within PSTN 18 of FIG. 1). A network-based PBX may then be "shared" by a number of different customers. Regardless of its location, however, PBX switch 14 is considered as the "home" PBX for the purposes of the present invention, and it is the PBX functionality of that switch which is emulated in the remote/mobile environment by the remote worker in accordance with the teachings of the present invention.

A "remote"/home office location 22 is also shown in FIG. 1, utilizing a connection 24 (such as, for example, a cable connection) to provide all communication access (i.e., voice and data) to location 22. In particular, a cable modem 26 is connected to cable 24 and used to supply the various signals to different devices within location 22. At a cable headend 28 as shown in FIG. 1, a voice connection 30 is made to PSTN 18 and a data connection 32 is made to Internet 20.

The "remote office" features are provided to location 22 via a remote office platform 34, configured as shown in FIG. 1 to be communication with the conventional office 16 (or network-based PBX $14_P$) to effectively re-route traffic destined for station set 12 to a remote station set 36 and/or computer terminal 38. Remote office platform 34 includes a switch controller 42, service controller 44 and database 46. In the embodiment of FIG. 1 where PBX switch 14 is located within office 16 (i.e., as a CPE PBX), switch controller 42 is directly connected to PBX 14. In the case where a network-based PBX is used, an additional switch (illustrated in phantom as switch 40 within PSTN 18) may be used to direct the information flow from switch controller 42 to a network-based PBX $14_P$ (also illustrated in phantom within PSTN 18 of FIG. 1). A data connection 50 is shown as coupling data/Internet network 20 to service controller 44.

The following discussion will provide details associated with "call flow" to/from a remote worker prior to activating the "mobility" option of the present invention, since it is important to first understand the workings of the remote office platform and the implementation of the PBX-like features for a remote worker. As mentioned above, a remote worker must first "log in" to the virtual PBX system in order to avail himself of any of the call features discussed above. To log in, a remote worker dials in, via his endpoint terminal (such as computer terminal 38) over data network 20 to a security system 52 within service controller 44.

Various security arrangements can be used to authenticate the remote worker and his capability to access the virtual PBX system. For example, a personal ID number and password may be used. Other arrangements are possible. Once the remote worker is authenticated, service controller 44 sends a message to switch controller 42, indicating that the control of all telecommunications associated with the identified remote worker are to be passed by PBX 14 to remote platform 34. Switch controller 42 then sends a message identifying the remote worker to PBX 14 and as a result, PBX 14 will now hand off all call control to remote platform 34 for calls received for the remote worker's identified station 12 within office 16 (whether the calls originate within the office or outside of the office) and PBX 14 will react based upon instructions from remote platform 34. Obviously, the same mechanism will be utilized for a network-based PBX, where switch controller 42 instructs switch 40 to locate PBX switch $14_P$ and function as described above to hand off all telecommunications traffic destined for the remote worker to remote office platform 34.

An important feature of the "virtual PBX" arrangement which is particularly advantageous when incorporating the mobility aspect of the present is that the remote worker's actual location is not necessary for others to know in order reach him at his usual office phone number. That is, a caller places a call to the remote worker in the usual fashion, dialing the office phone number associated with the remote worker (for internal calls, abbreviated dialing in terms of a 4 or 5-digit number may be dialed; for external calls, the conventional full number is dialed). PBX 14, upon recognition of the dialed number, will "hand off" the incoming call to remote platform 34 via (for example) a CTI link 56 to switch controller 42 (network PBX $14_P$ utilizing a similar CTI link $56_P$). The call is then passed to service controller 44 which performs a look-up in database 46 to determine the "reach" number for the remote worker. As will be discussed in detail below, the "reach" number becomes, by default, the worker's mobile number once a "remote session" is completed. Once the reach number is obtained, service controller 44 sends an "incoming call" message to the remote worker's "soft phone" via data network 20. If the remote worker is on another call, they have the option to place the first call on hold (such as by "clicking" the "hold" button 62 on soft phone display 60 of FIG. 2) and take the second call. In reality, when the "hold" button is activated on display 60, a "hold call" message is sent, via data network 20, back to PBX 14 which will, in fact, place the first call on "hold" within PBX 14. If there is no answer or a "busy signal" is encountered at the remote location, remote platform 34 will instruct PBX 14 to forward the call to, for example, a voice messaging system (not shown, but may be included within service controller 44). Upon being notified that a voice message has been recorded, service controller 44 will send an indication to endpoint terminal 38 that a new voice message has been received, resulting in "lighting" a voice mail indicator 64 on soft phone display 60. Obviously, in situations where the endpoint terminal does not include a display device, an alternative type of indication (such as a different ring pattern) may be used as the indicator.

The remote worker is also capable of placing outbound calls from endpoint terminal 38, where these calls will ultimately be processed by PBX 14. Therefore, the remote worker may use a speed dialing list, or any other PBX-like feature associated with his office station set 12 and stored in database 46 of remote office platform 34. The request to place the call may be initiated by activating, for example, "connect" button 66 on display 60. The "call connect" message is then sent, via data network 20, to remote platform 34. Service controller 44, in turn, tells switch controller 42 to instruct PBX 14 to place the call. PBX 14 ultimately connects the parties by launching a first call to the remote worker's station and a second call to the called party number, then bridges the calls together. In this "virtual PBX" arrangement, therefore, the remote worker's telephone will remain "on hook" for outbound calls until the remote platform calls back to bridge the calls together.

Figure 2:
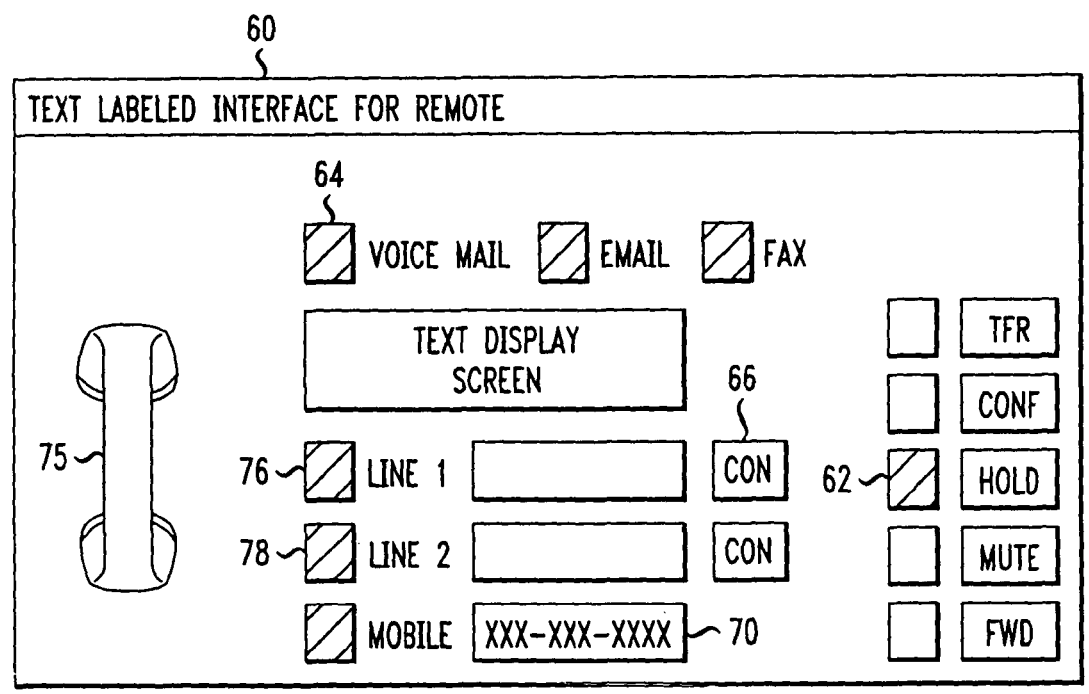
FIG. 2 illustrates an exemplary "soft phone" graphical user interface (GUI) available for a remote worker, including a mobile number interface.

An exemplary "soft phone" display 60 is illustrated in FIG. 2, and illustrates some of the various PBX station-type functionalities available for the remote worker. In accordance with the present invention, a mobile number (designated "MN" in FIG. 1) associated with the user is entered into field 70 on soft phone display 60 and will thereafter be used to control the remote mobility process of the present invention. That is, once a remote user ends a session at a remote location such as location 22, a remote mobility process 72 located (for example) on remote office platform 34 will be activated, passing the mobile number from service controller 44 to switch controller 42. In one embodiment, mobility process 72 may be implemented as a Java script applet; however, various other tools may be used to generate the process controls necessary to provide the remote functionality. Referring back to FIG. 2, switch controller 42 will then inform PBX 14 to forward all calls to the mobile number (which may be, for example, the remote worker's cell phone number or reach number associated with any suitable PDA 74). Therefore, even though a remote worker ends a particular "virtual PBX" session at location 22, the remote worker will remain accessible via the activation of mobility process 72. The process will continue to run until the remote worker logs in again, returns to the office location, or otherwise terminates the mobile session.

In accordance with one embodiment of the present invention, once a "mobile" remote session is active, a check is made to determine if PDA 74 can support a "mobile" soft phone GUI (such as display 60 of FIG. 2). If it can support such a display, the soft phone GUI is pushed, via data network 20, to PDA 74. Voice communication between remote platform 34 and PDA 74 will be maintained, in most cases, by a connection between PSTN 18 and PDA 74. However, the capability of utilizing IP telephony delivered via data network 20 cannot be ruled out. Alternatively, a "mobile" soft phone GUI may be implemented as software resident on the worker's remote device, where the software is activated upon initiation of the mobile session. Broadly speaking, in either embodiment, mobile process 72 of the present invention functions to "enable" the GUI at the mobile device (i.e., by "pushing" it across the data connection or activating the resident software).

Various other features may be included in soft phone display 60, and utilized at either the remote worker's "home" office equipment 38 or PDA 74 (if possible). As shown, a graphical handset 74 may be included and activated to go "off-hook" by a mouse click—either to answer an incoming "soft phone" call (to be forwarded from the office PBX) or place an outbound call "soft phone" call (to be forwarded to the office PBX for completion). Display 60 may also include a set of line indicators, in this example, a pair of line indicators 76 and 80 (showing that two separate "soft phone" lines are coming into endpoint terminal 38), where the indicators will illustrate the presence of an incoming call (by changing color, for example) or the "hold" state of one call while another is being answered (by "blinking", for example). Other elements, discussed in detail in our co-pending application include, speed dialing, a message area (in which information such as caller ID may be displayer). Display 60 may also include "message waiting" lights and indicators to activate various types of call treatment (e.g., hold, forward, conference, mute, etc.).

Figure 3:
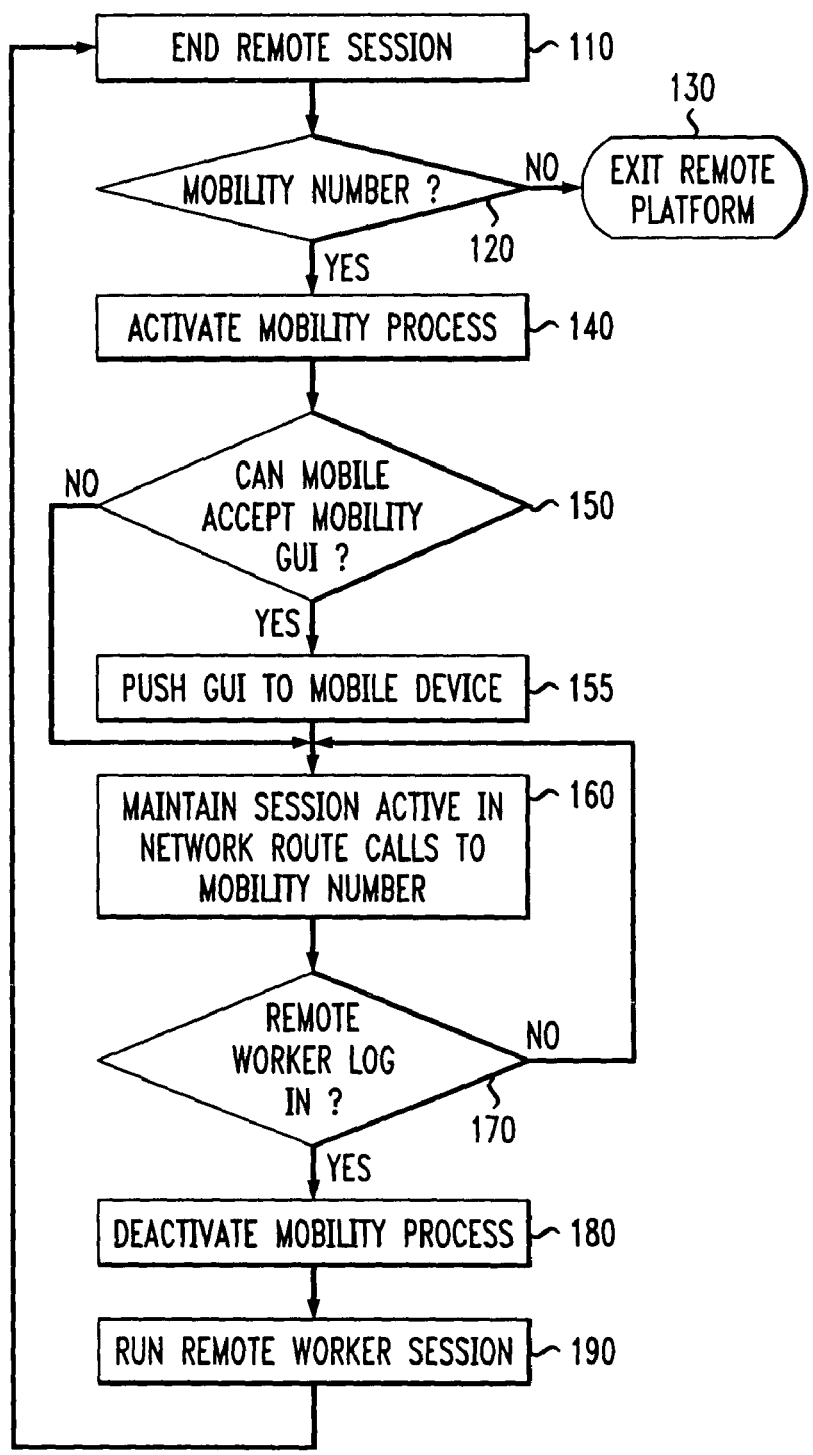
FIG. 3 is a flowchart illustrating the utilization of the mobility concept of the present invention.

FIG. 3 contains a flowchart 100 illustrating the process steps associated with invoking the remote worker mobility system of the present invention. At an initial step 110, a remote worker decides to end a particular remote session, for example, when the worker is leaving location 22. As the worker terminates, a check is made (step 120) to determine if the user has entered a mobility number MN (such as in field 70 in display 60 of FIG. 2). This number may be stored, for example, in the subscriber's information within database 46 of remote office platform 34 and then forwarded to mobile process 72 when required. If no mobility information has been entered, the session will end in usual fashion (step 130), returning control to station set 12 associated with PBX 14. Alternatively, if a mobility number is found, mobility process 72 will be activated (step 140) and a check will be made (block 150) to determine if mobile device 74 associated with the particular mobility number includes a display to which the soft phone GUI may be sent (or alternatively, this step may be used to send a command to mobile device 74 to "activate" its resident GUI software). If a GUI display is not available at the mobile device, the session will be maintained (block 160) in the best way possible using the existing voice and data communication capabilities (in terms of implementing call forwarding, transferring, etc.). If the display on mobile device 74 supports the soft phone GUI, it will be enabled at device 74 (block 155) prior to activating the session with mobility device 74 (block 160). One aspect of process 72 will be to monitor the activity of the remote user, in particular, looking for an occasion when the user either logs back into remote platform 34, returns to a location (e.g., the actual office location) which allows for direct access to PBX 14, or otherwise terminates the mobile session, where any of these actions results in "deactivating" the mobile session (step 170). Once a "deactivate mobile session" message is perceived by process 72, the mobility number will be deactivated (step 180) and either a remote session or "office" session may resume (step 190). Again, once the remote worker terminates a subsequent session, the mobility number will be reactivated (unless and until changed or removed by the remote worker).

In an environment as described above where the mobile device cannot support a soft phone GUI, the remote worker's mobile access to remote office platform 34 is limited to a traditional telephone set (that is, the mobility number is a conventional cell phone with no data connection), the "virtual PBX station" attributes can be provided by using various DTMF tones to determine call control.

While the present invention has been described in connection with the illustrated embodiments, it will be appreciated and understood that modifications may be made without departing from the true spirit and scope of the invention. It is to be understood that the particular embodiments shown and described are by way of illustration and in no way intended to be considered limiting. Therefore, references to details of a particular embodiment are not intended to limit the scope of the claims, which in themselves recite only those features regarded as essential to the invention.

What is claimed is:

1. A remote office system for providing PBX functionality at a mobile location not directly connected to a PBX switch, the remote office system comprising:
   a remote office fixed location including voice and data communication network interconnections;
   a remote office platform coupled to the PBX switch and the remote office fixed location data communication network interconnections for transferring PBX call feature commands between the remote office fixed location and the PBX switch to cause the PBX switch to provide PBX call feature functionality for the remote office fixed location; and
   a mobility processor, located at the remote office platform, for monitoring a user's activity at a remote office fixed location and activating a PBX session between the PBX switch and a mobile device defined by a user-identified mobile number upon sensing the termination of a session at the remote office fixed location, thereafter providing PBX call feature functionality at the user's mobile device.

2. The remote office system as defined in claim 1 wherein the mobility processor is implemented as a Java script applet.

3. A remote office system as defined in claim 1 wherein the remote office voice and data interconnections comprise a cable modem.

4. A remote office system as defined in claim 1 wherein the remote office voice interconnection comprises a PSTN connection and the data interconnection comprise a data modem.

5. A remote office system as defined in claim 1 wherein the remote office platform includes an authentication system for checking and approving the eligibility of a user at a remote location to access the PBX switch.

6. A remote office system as defined in claim 1 wherein the remote office platform includes a service controller for processing the PBX commands received from the remote office fixed location and a switch controller responsive to the output of the service controller for forwarding said PBX commands to the PBX switch.

7. A remote office system as defined in claim 6 wherein the PBX switch is an office-based customer premise equipment PBX switch and the switch controller communicates directly with the office-based PBX switch.

8. A remote office system as defined in claim 6 wherein the PBX switch is a network-based PBX switch, shared by a plurality of customers and the remote office system further comprises a switch disposed between the switch controller and the PBX switch to control the flow of communication between the network-based PBX and the remote office platform.

9. A remote office system as defined in claim 1 wherein the remote office fixed location includes a graphical user interface emulating a PBX station set for providing the PBX call features at said remote location, including a field for entry of the user-identified mobile number associated with the user's mobile device.

* * * * *